(12) United States Patent  
Remien

(10) Patent No.: US 12,471,562 B2
(45) Date of Patent: Nov. 18, 2025

(54) PET SAFETY APPARATUS

(71) Applicant: Michael Ryan Remien, Naples, FL (US)

(72) Inventor: Michael Ryan Remien, Naples, FL (US)

( * ) Notice: Subject to any disclaimer, the term of this patent is extended or adjusted under 35 U.S.C. 154(b) by 42 days.

(21) Appl. No.: 18/243,675

(22) Filed: Sep. 8, 2023

(65) Prior Publication Data

US 2024/0081273 A1    Mar. 14, 2024

Related U.S. Application Data

(60) Provisional application No. 63/404,549, filed on Sep. 8, 2022.

(51) Int. Cl.
| | |
|---|---|
| *B60R 22/10* | (2006.01) |
| *A01K 1/02* | (2006.01) |
| *A01K 27/00* | (2006.01) |
| *B60R 21/0132* | (2006.01) |
| *B60R 21/18* | (2006.01) |
| *B60R 22/14* | (2006.01) |
| *B60R 22/34* | (2006.01) |

(52) U.S. Cl.
CPC .......... *A01K 1/0272* (2013.01); *A01K 1/0263* (2013.01); *A01K 27/002* (2013.01); *B60R 22/10* (2013.01); *B60R 22/14* (2013.01); *B60R 22/34* (2013.01); *B60R 21/0132* (2013.01); *B60R 21/18* (2013.01)

(58) Field of Classification Search
CPC .. A01K 1/0272; A01K 1/0263; A01K 27/002; B60R 22/10; B60R 22/12; B60R 22/14; B60R 22/34; B60R 21/0132; B60R 21/18; Y10S 119/907
See application file for complete search history.

(56) References Cited

U.S. PATENT DOCUMENTS

| | | | | |
|---|---|---|---|---|
| 3,865,329 | A  * | 2/1975 | Higbee | B60R 22/38 |
| | | | | 242/383.1 |
| 7,690,051 | B2 * | 4/2010 | Uchida | A62B 35/04 |
| | | | | 2/69 |
| 10,189,435 | B2 * | 1/2019 | Templeton | A01K 27/002 |
| 11,266,122 | B1 * | 3/2022 | Howard | A01K 15/04 |
| 11,833,994 | B1 * | 12/2023 | Sadler | A01K 27/004 |
| 2017/0006834 | A1 * | 1/2017 | Waters | A01K 27/002 |
| 2022/0234538 | A1 * | 7/2022 | Buttolo | A01K 27/004 |
| 2022/0287899 | A1 * | 9/2022 | Candela | A62B 35/0006 |
| 2023/0242063 | A1 * | 8/2023 | Smart | B60R 22/34 |
| | | | | 119/771 |
| 2023/0320316 | A1 * | 10/2023 | Cohn | G08B 25/00 |
| | | | | 119/850 |
| 2024/0227720 | A1 * | 7/2024 | Boggs | B60R 22/10 |
| 2024/0324547 | A1 * | 10/2024 | Jaradi | B60R 22/10 |

FOREIGN PATENT DOCUMENTS

| | | | | |
|---|---|---|---|---|
| CN | 1775855 | A * | 5/2006 | |
| WO | WO-9403327 | A1 * | 2/1994 | B29D 24/005 |
| WO | WO-2020005836 | A1 * | 1/2020 | |

* cited by examiner

*Primary Examiner* — Keith J Frisby
(74) *Attorney, Agent, or Firm* — Gearhart Law LLC

(57) ABSTRACT

Apparatus for keeping a pet in a moving vehicle safe during a collision.

16 Claims, 16 Drawing Sheets

PET SAFETY APPARATUS

The present invention claims priority under 35 USC 119(e) to U.S. Provisional Application No. 63/404,549, filed Sep. 8, 2022, the entire contents of which is incorporated by reference.

BACKGROUND

When people drive, they often take their pets with them. Although cars have safety devices for people, such as seat belts and airbags, they do not have safety devices for pets. Consequently, in an accident, the likelihood of a pet being injured or killed is substantially higher, and the pet may also injure or kill other vehicle occupants as a projectile.

SUMMARY

Safety apparatus for keeping a pet, such as but not limited to a dog or cat, safe in a moving vehicle.

In illustrative embodiment, the apparatus includes a harness worn by the pet, secured to a mounting point attached directly to a vehicle frame or strut, or indirectly to such a mounting point, for example, a point to which a seat belt for a person is attached. The harness may include cushions filled with a shock-absorbing substance, which may include a gas such as air or $CO_2$ from a compressed cartridge, a liquid such as water, a gel pack, a compressible solid, or the like.

It is to be understood that both the preceding general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate disclosed embodiments and/or aspects and, together with the description, serve to explain the principles of the invention, the scope of which is determined by the claims.

In the drawings.

DETAILED DESCRIPTION

It is to be understood that the figures and descriptions provided herein may have been simplified to illustrate aspects that are relevant for a clear understanding of the herein described processes, machines, manufactures, and/or compositions of matter, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art.

Figure 1:
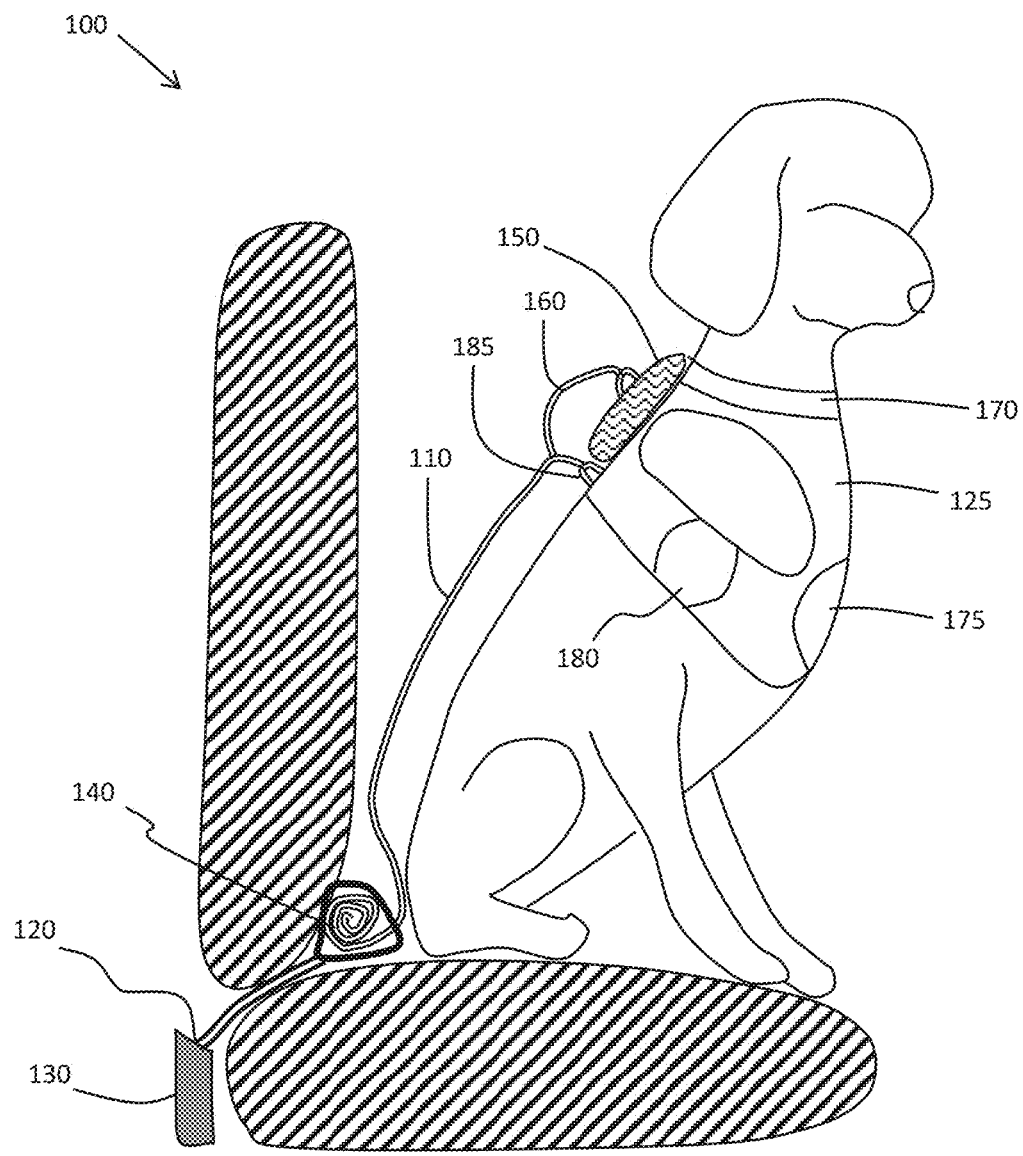
FIG. 1 illustrates an example embodiment of the disclosed safety apparatus in use.

FIG. 1 shows an example safety harness (100) in use. The example includes a tether (110) securely coupled at one end to an anchor point (120), and at the other end to an attachment point (185) coupled to the safety vest (125) worn by the pet. In an embodiment, the anchor point (120) may be a mounting point (130) of a conventional seat belt. In another embodiment, the anchor point (120) may be a mounting point used by a car seat for a small child, distinct from the mounting point used by a seat belt. In these embodiments, the tether (110) may be attached to the anchor point (120) using a carabiner buckle, or a nut and bolt with lock washers, or another suitably strong and durable anchoring mechanism, depending on how the mounting point is configured. In yet another embodiment, the anchor point (120) may include a female end of a seat belt buckle attached to the seat belt mounting point (130), into which a male end of a seat belt buckle attached to the tether (110) may be inserted and locked.

In embodiments, a locking retractor (140) may be disposed between the anchor point 120 and the tether (110), arranged to take up slack in the tether (110). The locking retractor (140) contains a spool that locks when the tether (110) is subjected to a sudden strong tug, such as would occur during a crash. Accordingly, when the pet wearing the safety vest (125) has settled into its preferred position or moves normally within the vehicle, slack in the tether (110) is taken up by the locking retractor (140). The locking retractor (140) can adjust the deployed length of the tether (110) to accommodate the pet's preferred position and regular movements. The tether (110) should be of a deployable length that does not allow the pet to roam inside the vehicle, for example, from the front seat to the back seat. Otherwise, the tether may unwind during normal conditions to the extent that it will not prevent the pet from becoming a projectile in the event of a crash before the retractor can lock.

In embodiments, a deployment pack (150) containing a replaceable cartridge of compressed $CO_2$ or the like may be permanently and securely attached to the safety vest (125), for example, by sewing them together. A trigger mechanism may be included in the deployment pack (150) and coupled by a connector (160) to the tether (110). In the event of a head-on collision, as the pet's inertia drives it forward, the connector (160) pulls on the trigger and causes the $CO_2$ cartridge to discharge its contents, causing the $CO_2$ to decompress and inflate cushions (170, 175, 180) attached to, or built into, the safety vest (125). In embodiments, cushions can be disposed in a neck and head deployment zone (170). This cushion inflates to protect the pet's neck and head. In embodiments, a cushion may be disposed in a chest deployment zone (175). This cushion inflates to protect the pet's chest, in particular the heart and lungs. In embodiments, the cushions can be disposed in left flank and right flank deployment zones (180). These cushions inflate on both sides of the pet's torso to protect others of the pet's vital organs. Cushions may be disposed in these zones individually or in any combination.

Figure 2A:
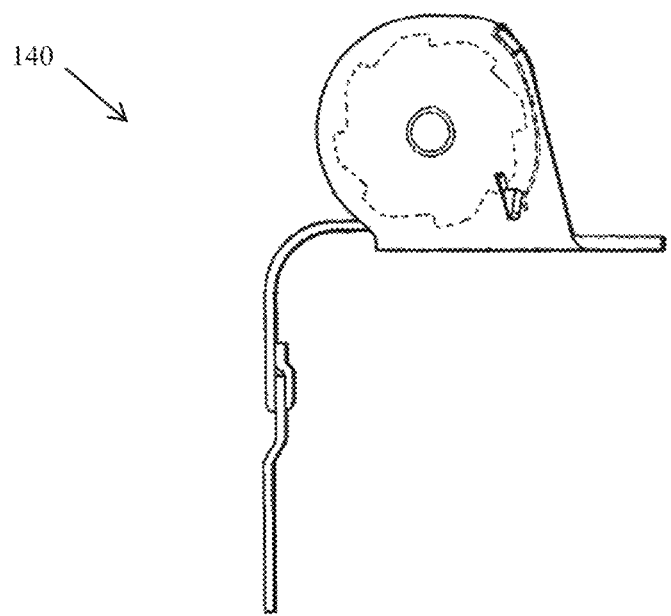
FIG. 2A illustrates an inertial locking retractor for use with the safety apparatus.
Figure 2B:
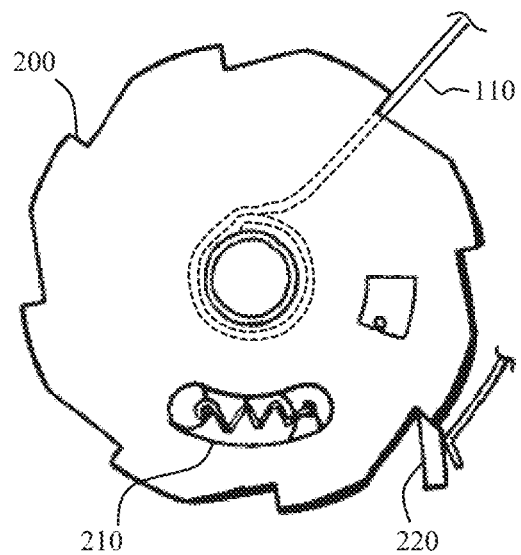
FIG. 2B shows a detail of the inertial locking retractor of FIG. 2A.

FIGS. 2A and 2B show aspects of an example inertial locking retractor (140) that would be attached to a device restraint (120), which may be a seat belt mounting point (130) or other restraint. For example, the inertial locking retractor (140) may be mounted to a robust structural element of the vehicle, such as a frame rail or structural strut. There are various types of inertial locking retractors, virtually any of which may be appropriate for use in the disclosed embodiments, provided they can be mounted securely and appropriately coupled to the tether. Much of the following description of an inertial locking retractor is derived from U.S. Pat. No. 3,865,329 entitled Inertial Locking Retractor, issued Feb. 11, 1975, and now expired, the entirety of which is hereby incorporated by reference as if fully set forth herein.

The inertial locking retractor locks when an internal retractor reel experiences a sudden strong tug. The inertial locking mechanism works independently of the rest of the vehicle. As such, it is not sensitive to the application of brakes and is not connected to any sensors. During regular operation, the locking retractor reel spins freely. The tether extends and retracts to accommodate the limited movement of the pet. However, when the reel mechanism experiences a sudden strong tug on the tether attached to it, a pawl engages and locks the reel in place preventing it from unwinding. This locks the tether in place, which in turn locks in place the safety vest attached to the tether. This keeps the pet in the seat during a frontal collision.

Specifically, in the locking retractor, a cable receptacle in the form of a spool is supported in a frame. A spool flange has ratchet teeth 200, and a rewind spring motor 210 biases the spool toward retraction under a moderate constant spring force. Slowly withdrawing the tether 110 that is wrapped around the spool overcomes the spring force. A pawl element 220 is supported in the frame and disposed and biased to slip into blocking engagement with the ratchet teeth 200. Thereby, the tether 110 is free to unwind from the spool when the tether 110 is gently pulled, and conversely, the spool takes up slack in the tether. A match plate having a profile substantially similar to that of the ratchet flange is mounted in the frame adjacent to and coaxial with the ratchet flange. The match plate is coupled to the ratchet flange in such a way that when they have synchronized, their teeth overlap and line up together, but if not, each one's teeth are disposed halfway between the teeth of the other because the match plate is biased relative to the ratchet flange to mismatch their teeth maximally. This prevents pawl 220 from entering the space between the ratchet teeth 200. The retractor is thereby primed to lock if a sudden hard tug pulls on the tether 110. Such a tug overcomes the bias of the match plate and causes its teeth to line up with those of the ratchet flange, allowing the biased pawl to slip into the space between the ratchet flange teeth forcing the spool to lock.

Figure 3A:
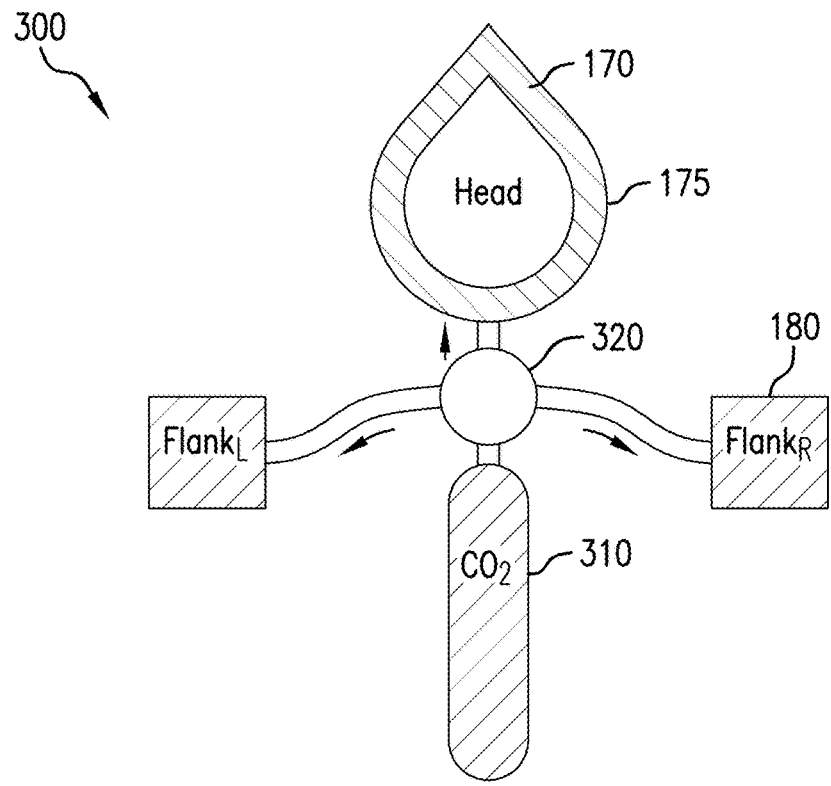
FIG. 3A is a compressed air diagram of an example embodiment of the disclosed safety apparatus.

FIG. 3A is a diagram of an example compressed $CO_2$ system 300. A compressed $CO_2$ cartridge 310 is coupled to a trigger (not shown) that causes the cartridge 310 to discharge. The released gas is distributed through at least one valve 320 to the cushions included in the example safety vest, in this case to a cushion protecting the head and neck 170, another protecting the chest 175, and two more protecting left and right flanks 180. Although the system is said to use $CO_2$ gas, other types of harmless gases may be used such as argon or nitrogen.

Figure 3B:
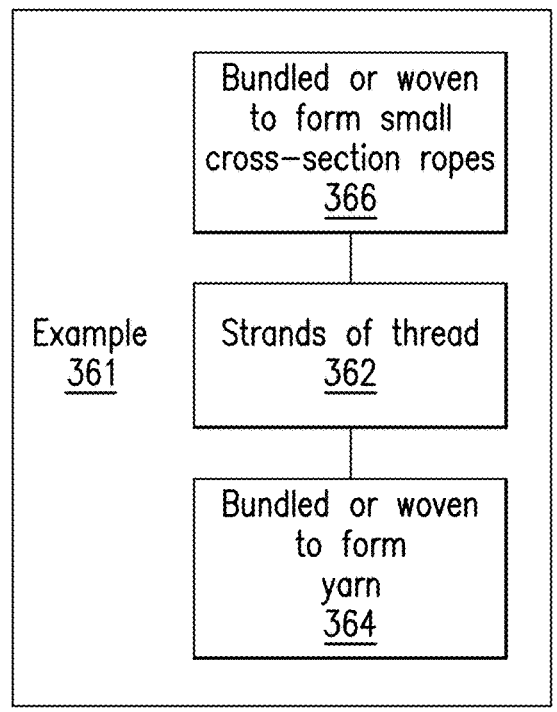
FIG. 3B is an example cushion structure for the disclosed safety apparatus.

FIG. 3B shows an example structure designed to channel and distribute the force exerted on the harness by the tether during a collision as evenly and quickly as possible. The structure may comprise one or more high tensile strength textiles. For example, the structure may comprise a plurality of hexagonal pads (350) that may contain a gas, liquid, or a combination of both to absorb an impact with an object, such as a dashboard inside a vehicle passenger compartment, caused by a frontal collision. Every pad is held within a hexagonal structure of high tensile strength fibers (360) or other elements that hold up especially well under tension. In an example 361, these may include strands of thread 362 that may be bundled or woven together and may form yarn 364. In an example 363, these may include strands of thread 362 that may be bundled or woven together and may form small cross-section ropes 366, or the like made from high tensile strength fibers 360. Such fibers may be natural fibers such as silk, or they may be synthetic fibers. Appropriate synthetic fibers may include aromatic copolyamide fibers having a highly oriented molecular structure such as Technora®, or aromatic polyamide fibers characterized by long rigid crystalline polymer chains such as Kevlar®, or an aromatic polyester spun from a liquid crystal polymer (LCP) in an extrusion process that orients the fiber molecules along the fiber axis such as Vectran®, or the like. The safety vest may include areas reinforced with these pads and fibers, or the entire vest may include such pads and fibers. The pads may be of any appropriate size and may appear similar to bubble wrap in that the vest envelops the pet in protective, shock-absorbing material.

Figure 4A:
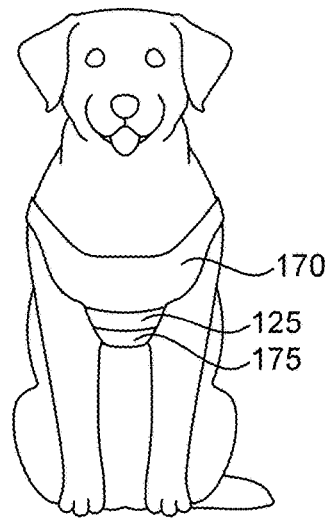
FIGS. 4A, 4B, 4C, and 4D are illustrations of the front, back, right side, and left side, respectively, of an example embodiment of the disclosed safety apparatus worn by a dog.
Figure 4B:
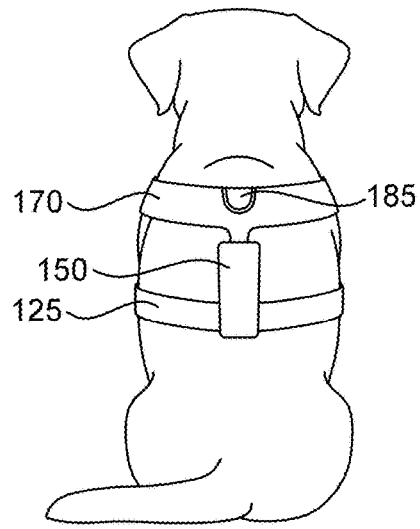
Figure 4C:
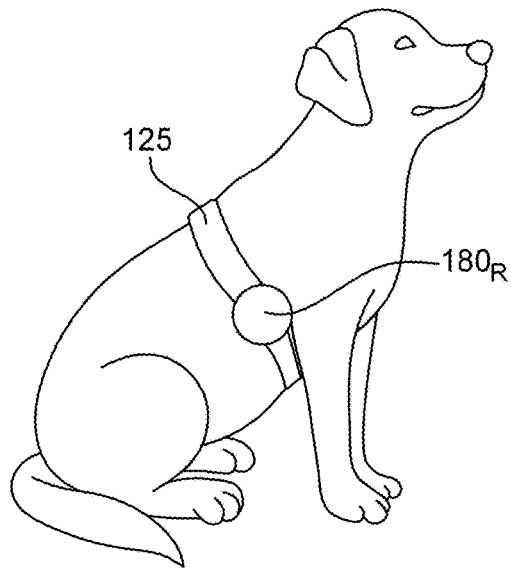
Figure 4D:
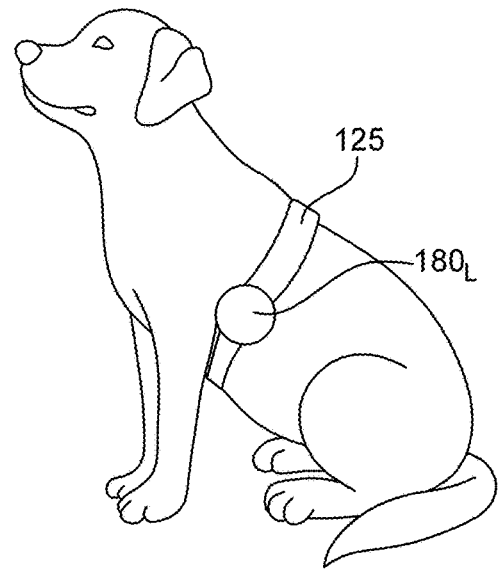

FIGS. 4A-4D show views of an example harness being worn by a dog. FIG. 4A shows a front view of the harness, including a portion of the head/neck zone cushion (170), a portion of the chest zone cushion (175), and a portion of the bubble wrap-like material of the safety vest (125). FIG. 4B shows a rear view of the harness, including the rear of the head/neck zone cushion (170), a rear portion of the safety vest material (125), and the deployment pack (150) containing the compressed gas cartridge, trigger, and valve. FIG. 4C shows a right side view, including the right inflation zone cushion ($180_R$) and safety vest material (125). And FIG. 4D shows a left side view, including the left inflation zone cushion ($180_L$) and safety vest material (125). The example shown in FIGS. 4A-4D is sized appropriately for use by a small dog or a large cat, or other similarly sized animal to wear while riding in a vehicle. Of course, it is contemplated that a variety of sizes will be produced and made available. For example, sizes may include extra small (XS), small (S), medium (M), large (L), extra large (XL), and extremely large (XXL). Each of these would be sized appropriately for pets having dimensions within particular ranges, from small lap dogs (XS) to large animals often originally bred to protect livestock, guard territory, or hunt, such as mastiff breeds (XXL) size and weight.

Figure 5A:
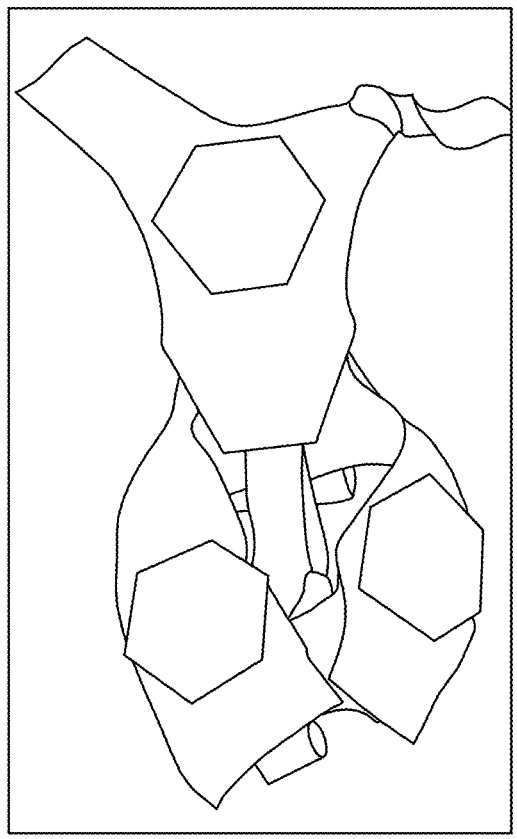
FIG. 5A is a view of an unfolded example of an embodiment of the disclosed safety apparatus.
Figure 5B:
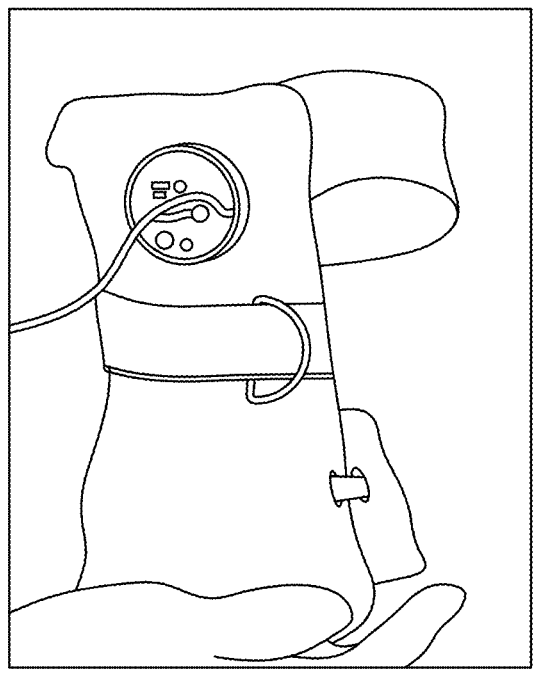
FIG. 5B is a view of the example safety apparatus of FIG. 5A, ready for storage.

FIGS. 5A and 5B show views of a prototype of an example harness. In FIG. 5A, the harness is unfolded and ready to be worn by a pet. In FIG. 5B, the harness is folded and/or rolled up, such as for convenient carrying and storage. As shown in FIG. 5B, the apparatus may comprise a strip of material or belt having two sides and two ends for holding the harness in a folded/rolled up state. The material may be in the form of a belt having a series of holes at one end and a buckle attached to the other end. The belt works in the usual way, i.e., by encircling the folded/rolled harness, tightening the belt, and passing the buckle latch through one of the holes to hold the folded/rolled harness tightly. Alternatively, the material may be in the form of a belt wherein the first and second ends have respective first and second cooperating fasteners attached to them. The fasteners may be disposed proximate respective ends on respective first and second sides of the belt. Such fasteners may be, for example, hook and loop fasteners, buttons and buttonholes, bottom and top snaps, or the like. The fasteners may be configured to allow for tightening the belt around the folded/rolled harness. For example, one of the hook and loop fasteners may take up an area longer than the other so the shorter fastener may be placed at a preferred position along the length of the longer fastener. Alternatively, a button may be attached to one end of the belt, and a series of buttonholes may be disposed along a length of the other end of the belt. Alternatively, one part of a snap may be attached to one end of the belt, and a series of cooperating snap parts may be attached at intervals along a preferred length of the other end of the belt. Of course, other types of fasteners may be used to fasten the ends of the belt tightly together to hold the folded/rolled harness.

Figure 6:
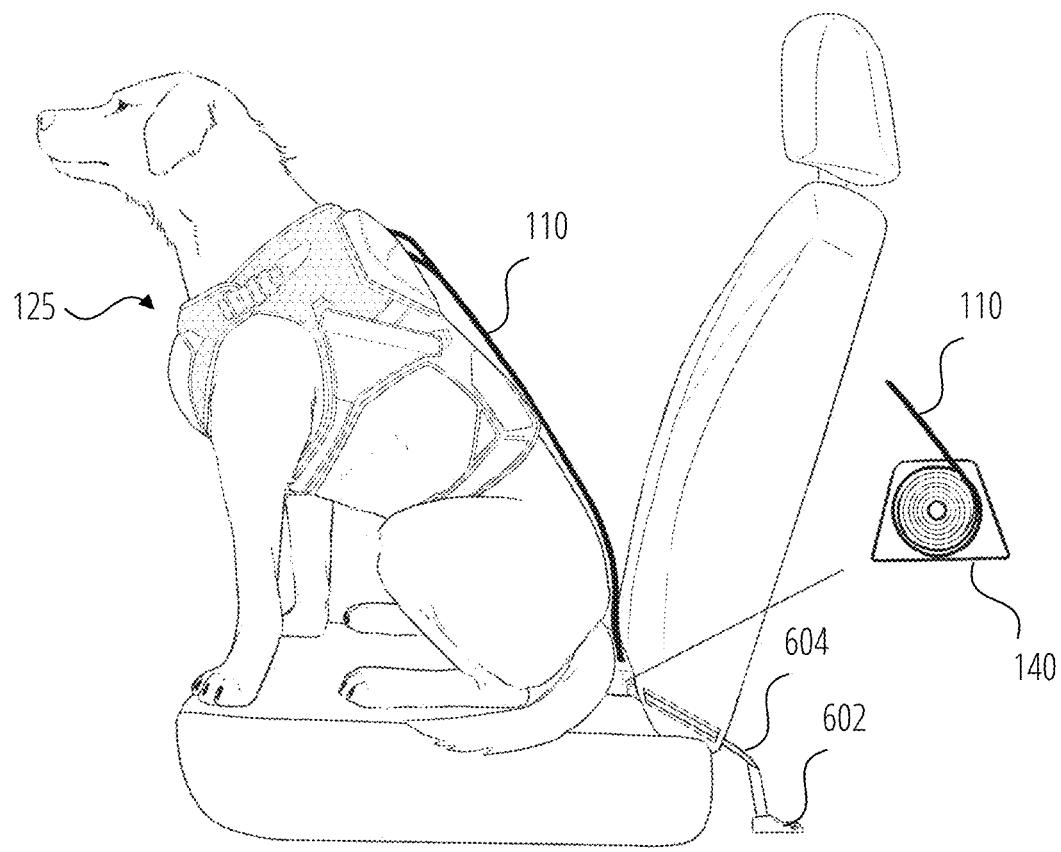
FIG. 6 is an environmental perspective view of the safety apparatus in use in accordance with an embodiment.

FIG. 6 shows an embodiment of the safety harness (125) that includes the plurality of hexagonal pads previously described. According to the embodiment of FIG. 6, one end of tether (110) is attached to the back of the harness (125) and the other end is rolled up in the inertial locking retractor (140). As discussed above, the locking retractor (140) contains a spool that locks when the tether (110) is subjected to a sudden strong tug, such as would occur during a crash. The inertial locking retractor (140) is connected to an anchor (602) behind one of the car seats. More specifically, an anchor line (604) connects the inertial locking retractor (140) to the anchor (602).

Figure 7A:
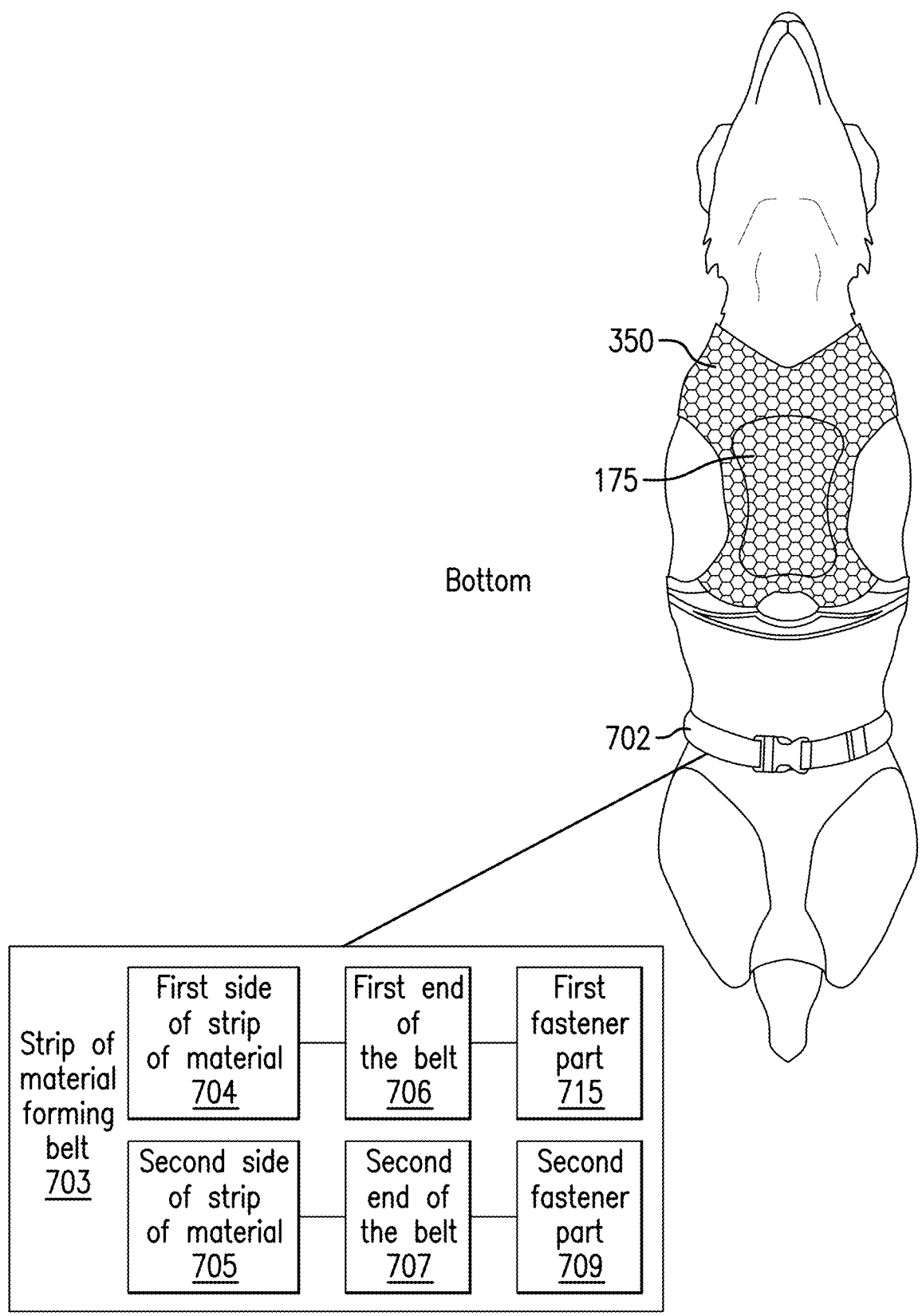
FIG. 7A is a bottom view of the safety apparatus in accordance with the embodiment of FIG. 6.

FIG. 7A shows a bottom view of the harness (125) with hexagonal pads attached to a dog and secured, at least in part, by a belt (702). The belt buckle is of the quick-side-release variety well known in the art. For example, a strip of material 703 as a belt 702 has a first side 704 and a second side 705 and a first end 706 and a second end 707. The first end 706 and the second end 707 have respective cooperating first fastener part 708 and a second fastener part 709 disposed thereon. However, one of ordinary skill in the art will appreciate that any other type of buckle may be used. An outline of an inflatable cushion is shown which is disposed in the chest deployment zone (175) and integrated into the harness (125). In addition, the plurality of hexagonal pads (350) previously discussed is shown integrated into the harness.

Figure 7B:
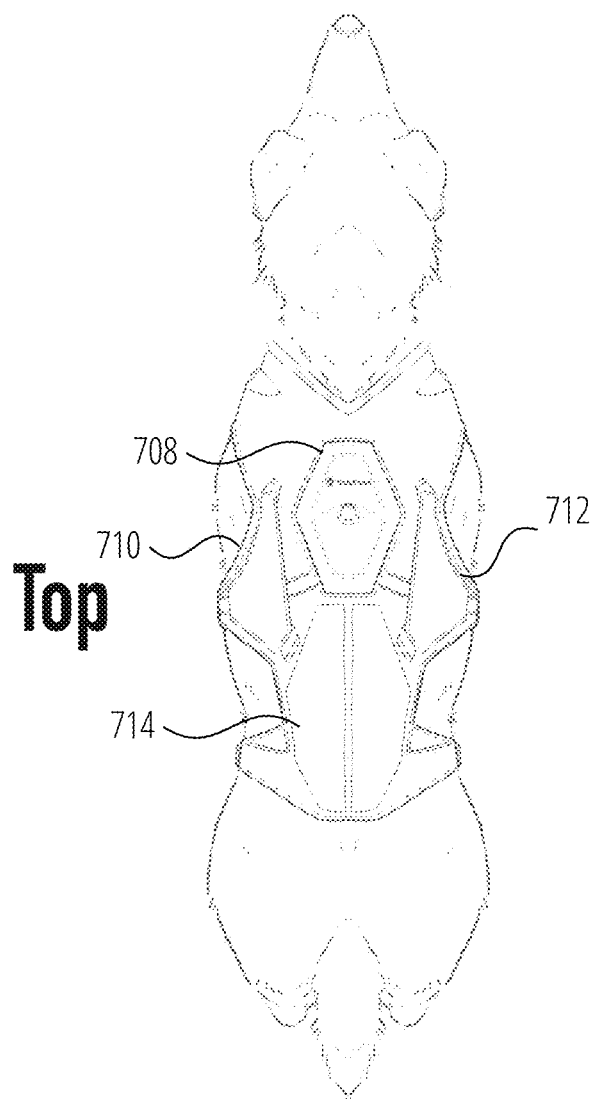
FIG. 7B is a top view of the safety apparatus in accordance with the embodiment of FIG. 6.

FIG. 7B shows a top view of the harness (125) with hexagonal pads worn by the dog. The inflatable cushion system, previously discussed with respect to FIG. 3A, is integrated into the harness. Inflatable cushions may be housed in shells such as left flank shell (710), right flank shell (712), and back shell (714). As discussed above, an integrated $CO_2$ or other gas cartridge is used to inflate the cushions in the event of a collision. The $CO_2$ cartridge may be housed in shell (708) which may include a logo imprinted thereon. Of course, the logo may be printed elsewhere on the harness or any of its components. Additional or fewer shells with inflatable cushions may be integrated into the harness and the shells may be positioned in a different arrangement than what is shown in FIG. 7B. In addition, multiple $CO_2$ or other gas cartridges may be housed in one or more shells or other types of housing integrated into the harness. Accordingly, the representation shown in FIG. 7B should be considered nonlimiting.

The inflatable cushion system described herein may be activated by the trigger mechanism previously described or may work similar to an airbag system, i.e., cushions are deployed upon a sensor such as an accelerometer detecting sudden deceleration. As the cushions inflate and expand, they blow a plastic cover off their respective shells. The inflatable cushions may also include small holes that allow the cushions to deflate.

Figure 8:
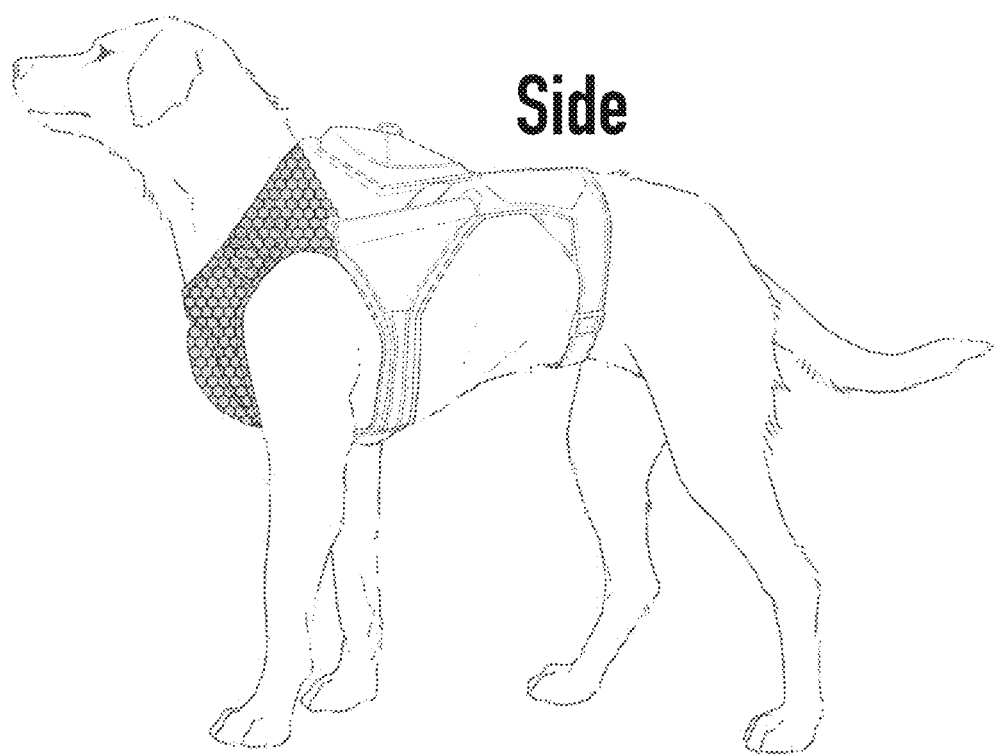
FIG. 8 is a side view of the safety apparatus in accordance with the embodiment of FIG. 6.
Figure 9:
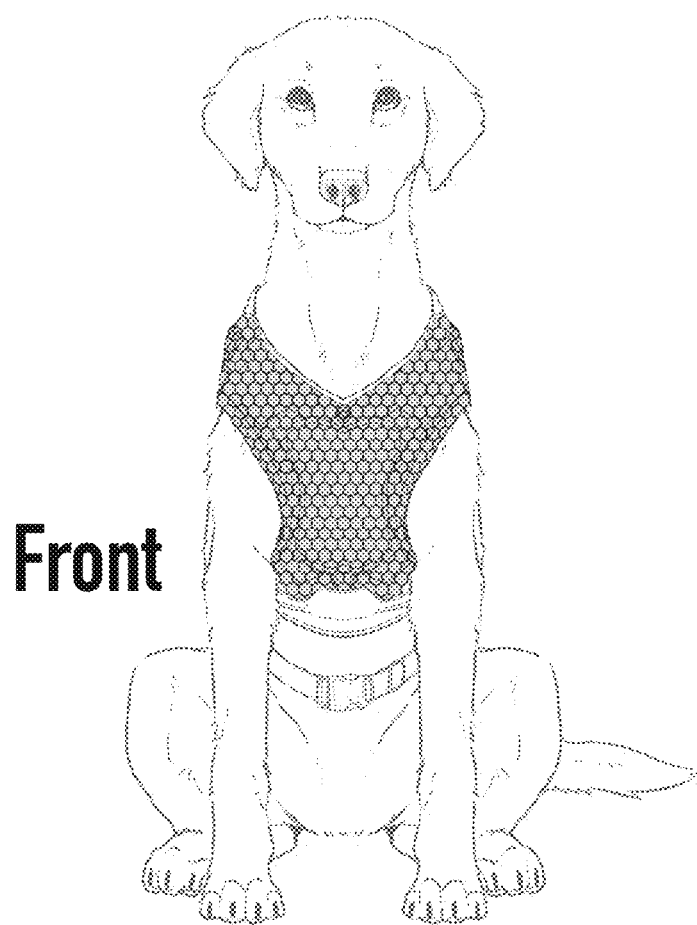
FIG. 9 is a front view of the safety apparatus in accordance with the embodiment of FIG. 6.
Figure 10:
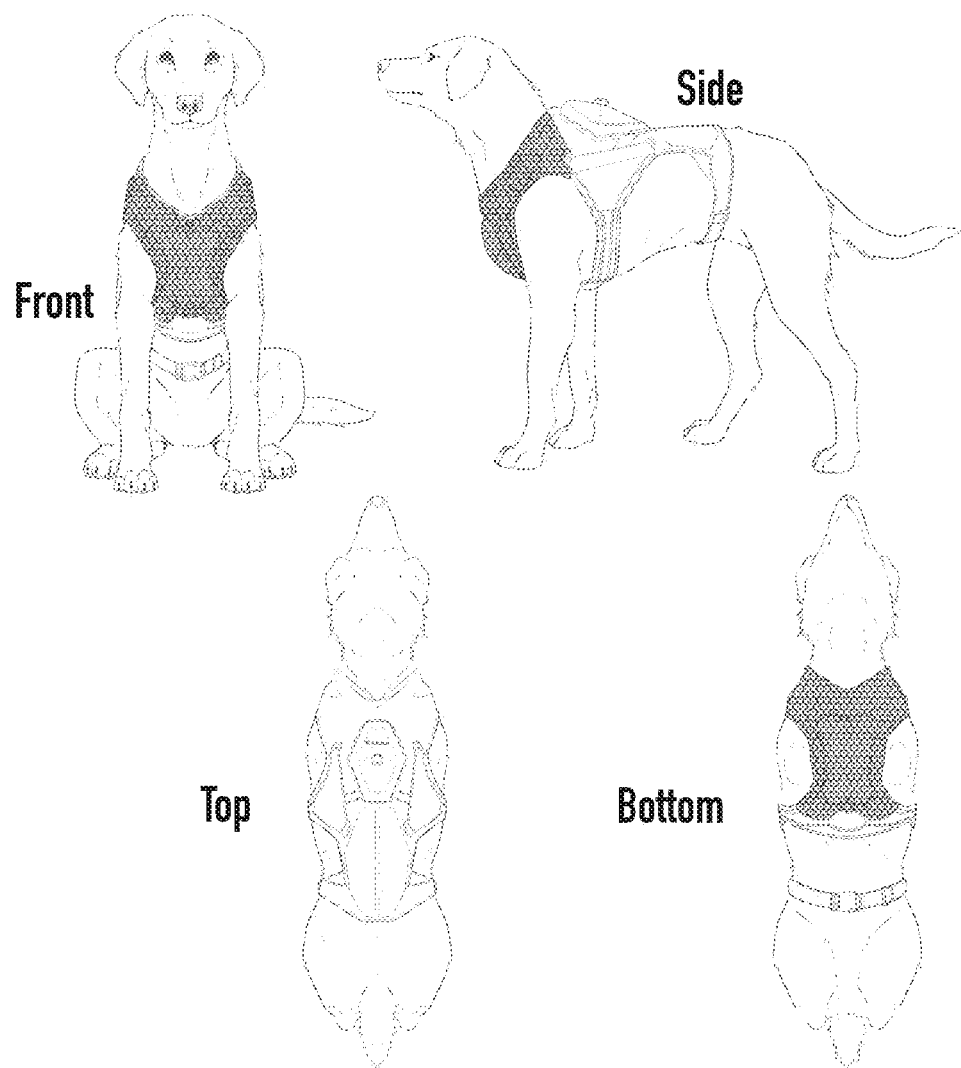
FIG. 10 shows front, side, top, and bottom views of the safety apparatus in accordance with the embodiment of FIG. 6.

FIG. 8-9 show side and front views of the safety harness (125) with hexagonal pads, respectively. FIG. 10 shows front, side, top, and bottom views of the safety harness with hexagonal pads worn by the dog.

Figure 11:
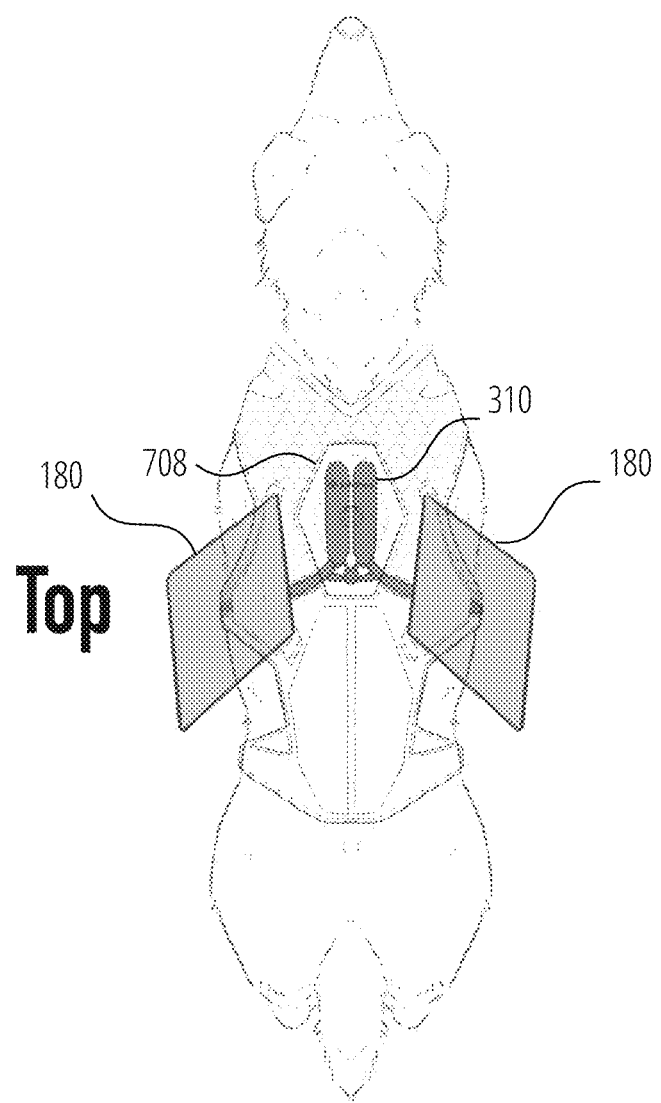
FIG. 11 is a top view of the safety apparatus in accordance with another embodiment.

FIG. 11 is a top view of the safety harness (125) that illustrates a dual cartridge embodiment of the harness. More specifically, FIG. 11 shows two $CO_2$ cartridges 310 with separate lines leading to left and right flank deployment zones, respectively. According to FIG. 12, the two cartridges are housed in shell 708. However, one of ordinary skill in the art will appreciate that the cartridges may be housed in separate shells. The cartridges are configured to supply $CO_2$ gas to left and right flank cushions in the corresponding left and right flank cushion zones.

Figure 12:
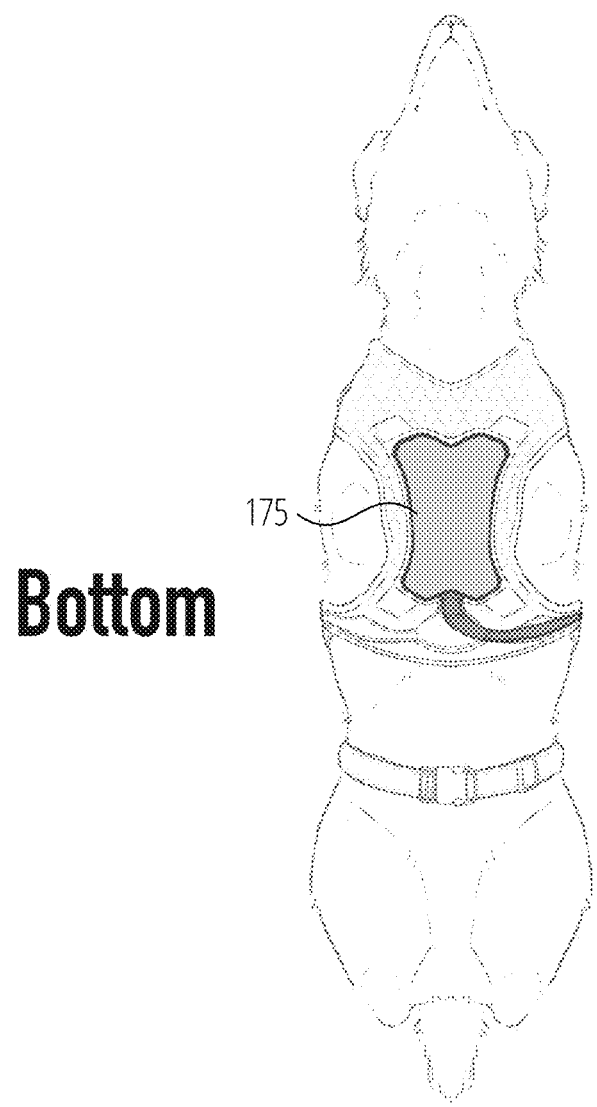
FIG. 12 is a bottom view of the safety apparatus in accordance with the embodiment of FIG. 11.

FIG. 12 is a bottom view of the safety harness (125) that shows the chest deployment zone (175) with a gas line connection for the inflatable cushion disposed in the chest deployment zone. As previously discussed, the $CO_2$ cartridge is configured to inflate the inflatable cushion with $CO_2$ gas when the trigger mechanism is activated. However, as discussed, other types of gas cartridges may be employed to generate a gas other than $CO_2$, such as nitrogen or argon.

Figure 13:
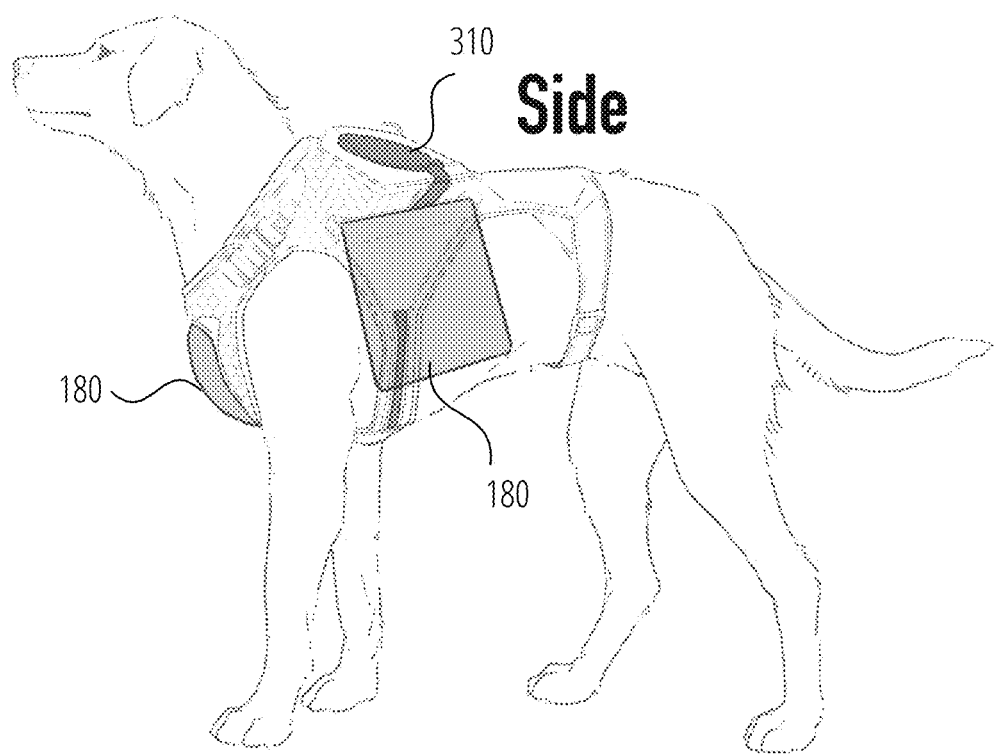
FIG. 13 is a side view of the safety apparatus in accordance with the embodiment of FIG. 11.

FIG. 13 is a side view of the safety harness (125) worn by a dog showing the left and right flank deployment zones (180) in which corresponding left and right flank cushions are disposed.

Figure 14:
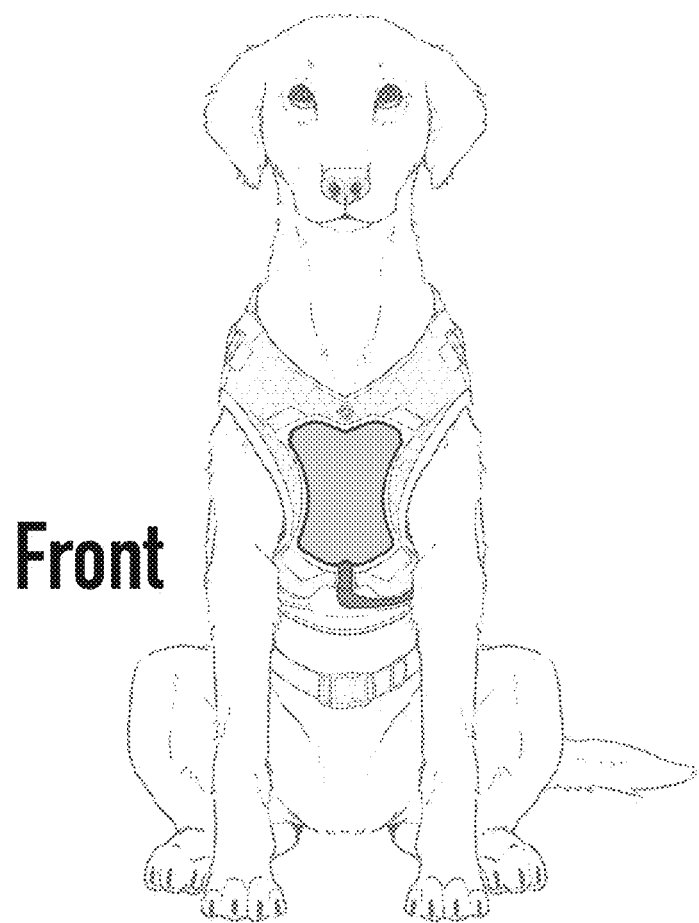
FIG. 14 is a front view of the safety apparatus in accordance with the embodiment of FIG. 11.

FIG. 14 is a front view of the safety harness (125) showing the chest deployment zone (175) in which the chest zone cushion is disposed.

Figure 15:
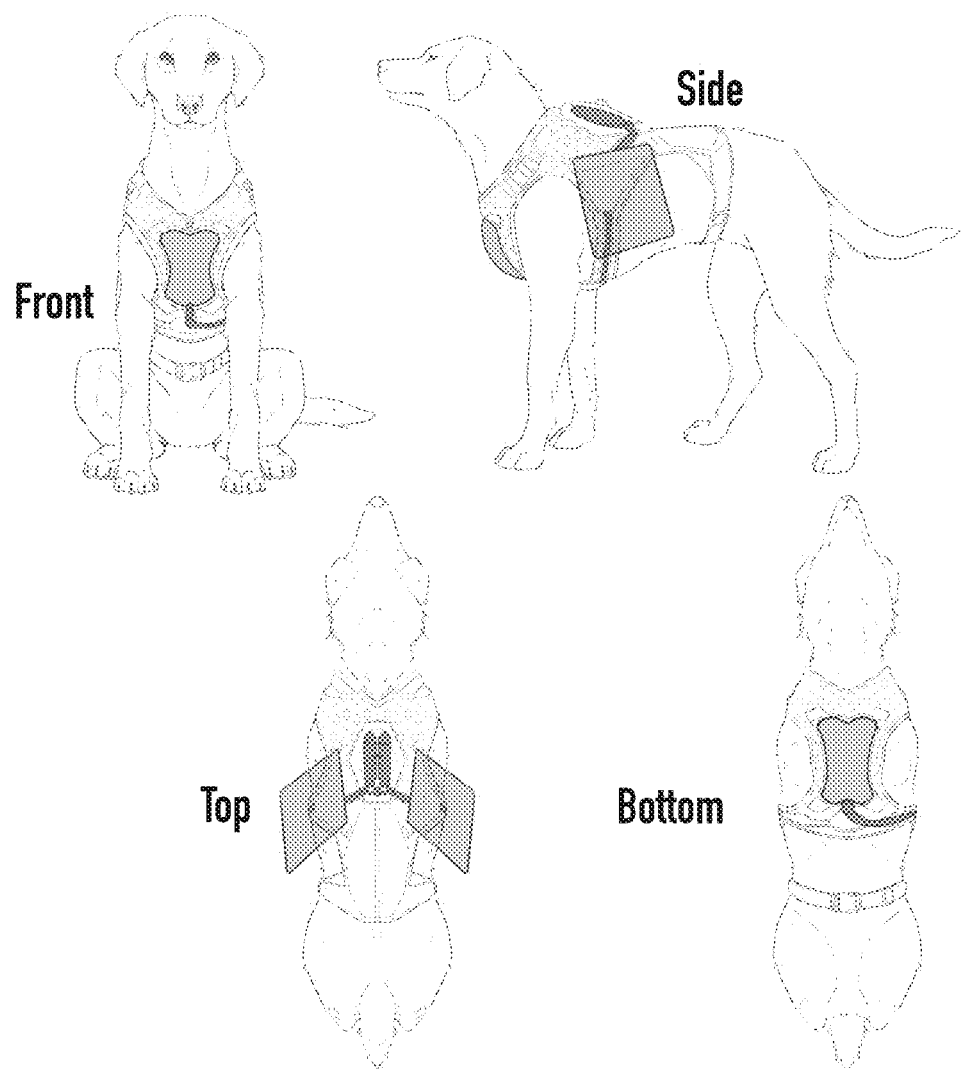
FIG. 15 shows front, side, top, and bottom views of the safety apparatus in accordance with the embodiment of FIG. 11.

FIG. 15 shows front, side, top, and bottom views of the dual cartridge embodiment of the safety apparatus.

Although the invention has been described and illustrated in exemplary forms with a certain degree of particularity, it is noted that the description and illustrations have been made by way of example only. Numerous changes in the details of construction, combination, and arrangement of parts and steps may be made. Accordingly, such changes are intended to be included within the scope of the disclosure, the protected scope of which is defined by the claims.

What is claimed is:

1. A safety apparatus for use with a pet riding in a vehicle, comprising:
   a harness made of a flexible material configured to fit the pet;
   a plurality of distinct regular polygonal pads;
   a substance retained within each distinct regular polygonal pad of the plurality of distinct regular polygonal pads;
   a hexagonal structure of a plurality of hexagonal structures to border an outer perimeter edge of each distinct regular polygonal pad of the plurality of distinct regular polygonal pads to form a pattern of a regular hexagonal tessellation, in which a first portion of a first hexagonal structure abuts a first portion of a second hexagonal structure, the hexagonal structure to retain each distinct regular polygonal pad; and
   a tether attached to the harness and to a mounting point attached to a structural element of the vehicle.

2. The apparatus of claim 1, wherein the mounting point is a seat belt mounting point.

3. The apparatus of claim 1, further comprising:
   a locking inertial retractor attached to and between the tether and the mounting point, wherein in a collision, an inertial motion of the pet causes the tether attached at one end to the harness worn by the pet to give a sharp tug on a part of the locking inertial retractor attached to another end of the tether, causing the retractor to lock.

4. The apparatus of claim 1, further comprising:
   at least one cushion attached to or embedded in the harness.

5. The apparatus of claim 4, wherein the at least one cushion is filled with one of an elastic deformable solid, a liquid, a gel, and a gas.

6. The apparatus of claim 5, further comprising a cartridge of compressed gas configured to discharge its contents into the at least one cushion when the at least one cushion is deployed.

7. The apparatus of claim 1, wherein the substance comprises at least one of a gas and a liquid.

8. The apparatus of claim 7, further comprising one or more fibers that are bundled or woven together to form strands of thread.

9. The apparatus of claim 8, wherein the strands of thread are bundled or woven together to form one of a yarn and a small cross-section rope.

10. The apparatus of claim 8, wherein the one or more fibers are natural or synthetic.

11. The apparatus of claim 10, wherein the one or more fibers are one of a group consisting of cotton, silk, aromatic copolyamide fibers having a highly oriented molecular structure, aromatic polyamide fibers characterized by long rigid crystalline polymer chains, and an aromatic polyester spun from a liquid crystal polymer (LCP) in an extrusion process that orients the one or more fibers along a fiber axis.

12. The apparatus of claim 11, wherein the plurality of distinct regular polygonal pads and the one or more fibers are implemented throughout a portion of the harness.

13. The apparatus of claim 1, wherein a broadest dimension of the distinct regular polygonal pads is in a range of ¼ inch to 2 inches.

14. The apparatus of claim 1, further comprising a strip of material as a belt, having a first side and a second side, and a first end and a second end, the first end and the second end have a respective cooperating first fastener part and a second fastener part disposed thereon; and
   wherein at least the harness can be folded, rolled up, or encircled by the belt, and the first fastener part and the second fastener part may be fastened together to hold the apparatus in a folded state or a rolled up state.

15. The apparatus of claim 14, wherein the first fastener part and the second fastener part are configured to fasten together.

16. The apparatus of claim 14, wherein the first fastener part and the second fastener part are configured such that the belt can be tightened.

* * * * *